Oct. 12, 1948.  T. T. EATON  2,450,945
PULSE-ECHO MOTION DETECTOR
Filed Sept. 13, 1941
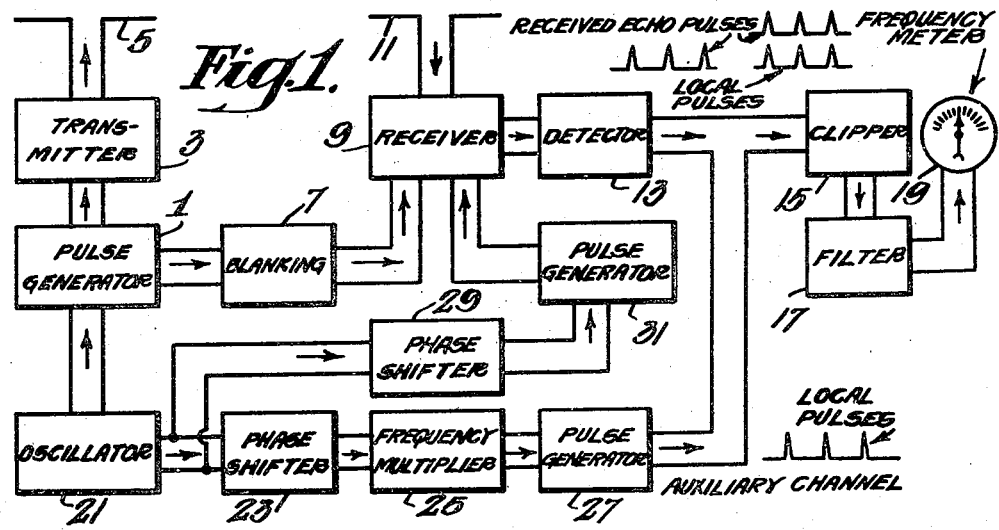
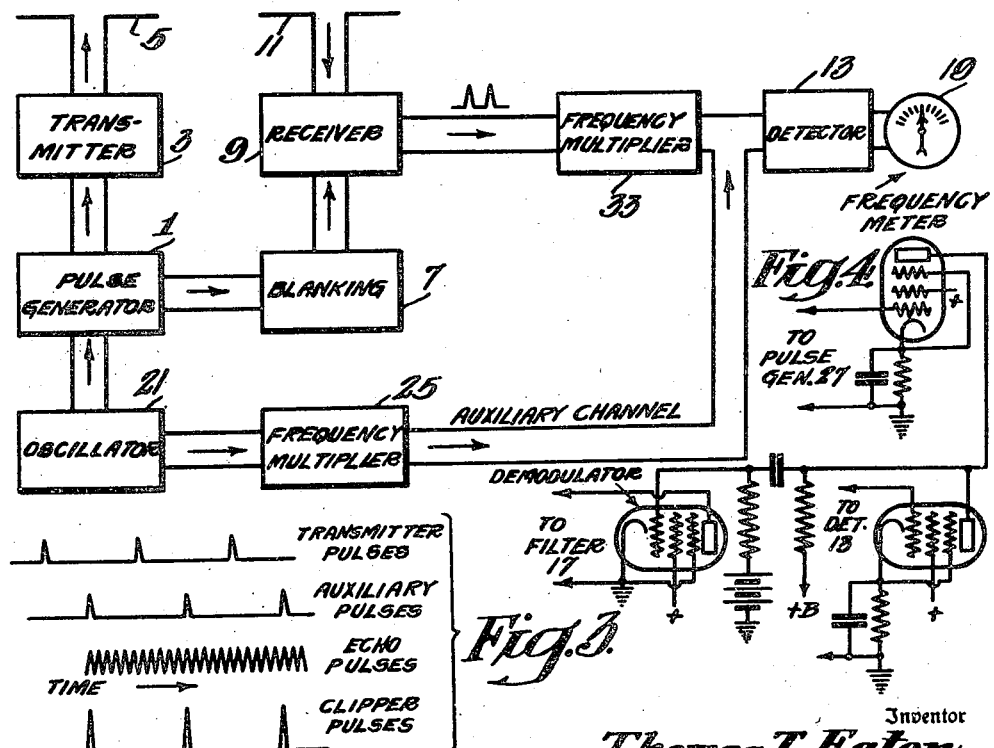
Inventor
Thomas T. Eaton
By
Attorney Patented Oct. 12, 1948

2,450,945

UNITED STATES PATENT OFFICE 2,450,945

PULSE-ECHO MOTION DETECTOR

Thomas T. Eaton, Haddon Heights, N. J., assignor to Radio Corporation of America, a corporation of Delaware Application September 13, 1941, Serial No. 410,693

9 Claims. (Cl. 343—8)

This invention relates to improvements in pulse-echo motion detectors and particularly to a radio pulse device for indicating the component of velocity, in the direction of the device, of a moving pulse-reflecting body.

The use of a pulse-echo system for indicating the presence of a pulse-reflecting body is well known to those skilled in the art. Pulse-echo systems have also been used to indicate the velocity of the reflecting object with respect to the pulse transmitter and receiver. One such early use was in the detection and measurement of the height of the Heaviside Layer as reported by Breit and Tuve in the Physical Review, vol. 28, page 554, of September 1926. Similar systems have been used to measure the velocity at which the Heaviside Layer rises and falls.

One of the objects of the instant invention is to provide improved means for indicating the velocity of a pulse-reflecting body as a function of the variation in frequency of the pulses due to the component of motion of the body along a line through the pulse source. Another object is to provide a pulse-echo system with means for indicating the component of velocity in a line, through the system, of a pulse-reflecting object and with means for eliminating undesired echo pulses from other objects. Another object is to provide an improved pulse-echo velocity indicating device in which the normal Doppler Effects are substantially increased by frequency multiplying the echo pulses.

The invention will be described by referring to the accompanying drawing in which Figure 1 is a schematic circuit diagram of one embodiment of the invention; Figure 2 is a schematic diagram of another embodiment of the invention; Figure 3 is a graph illustrating the phasing of the several pulses; and Figure 4 is a circuit diagram of the clipper employed in the system of Figure 1.

Referring to Figure 1, a pulse generator 1 is connected to a transmitter 3, which is connected to an antenna 5. The pulse generator is also connected through blanking means 7 to a receiver 9, which may employ the transmitter antenna or a separate antenna 11. The output of the receiver is applied through a detector 13 to a clipper 15 and hence through a filter 17 to a frequency meter or counter circuit and meter 19. The pulse generator 1 is connected to and is controlled by an oscillator 21, which determines the pulse frequency. The oscillator is also connected through a phase shifter 23 and a frequency multiplier 25 to a pulse generator 27. The output of the pulse generator 27 is applied to the clipper 15, which is hereinafter described.

The oscillator 21, actuating the pulse generator 1, is connected through a second phase shifter 29 and a second pulse generator 31 to the receiver. The second phase shifter 29 and the second pulse generator 31 may be omitted if the system is operated so that no undesired pulse echoes are received. For example, the second phase shifter and the second pulse generator would be used, if there were echoes from two objects, to block the receiver to all but one set of echoes. It will be necessary for the operator to adjust continuously the phase shifter 29 so that the blanking pulse will not also blank out the desired signal. If a single set of echoes is received, no auxiliary pulsing or blanking is necessary except for blocking the receiver to the pulses received directly from the transmitter.

The mode of operation is essentially as follows: Oscillatory currents are applied to the pulse generator 1 to control accurately the pulse frequency which is preferably higher than is ordinarily used in pulse-echo distance measurements. The transmitter applies the pulses to the antenna from which the radio frequency energy is radiated. The receiver 9 is biased to cut-off by the blanking means 7 so that the pulses received directly do not block the receiver to the echo pulses. The echo pulses are received and detected.

At the same time that the oscillator 21 is actuating the transmitter pulse generator 1, the actuating currents are shifted in phase or delayed. The frequency of the delayed currents may be multiplied, although multiplication is not essential. The delayed currents actuate the pulse generator 27 in the auxiliary channel which applies the auxiliary pulses to the clipper. The transmitter pulses and the auxiliary pulses and their phase relation are shown in Figure 3.

If the transmitter pulses are radiated at a uniform rate, it follows that a stationary pulse-reflecting object at some critical distance $$\frac{x}{2}$$

will reflect the pulses so that the initial pulse from the transmitter will travel to the object and, after reflection, back to the receiver and transmitter at the very instant the second pulse is being radiated. Likewise, the second pulse from the transmitter will be reflected and returned to the receiver at the instant the third pulse is being radiated. If the distance of the pulse-reflecting object be increased to X, the initial radiated pulse will be reflected and received at the instant the third pulse is radiated. In a similar manner, it can be shown that radiated and reflected pulses coincide for distances corresponding to $$\frac{3X}{2}, 2X, \frac{5X}{2}, 3X \ldots \frac{NX}{2} \text{ and } NX$$

The clipper 15 is adjusted so that pulses from the detector 13 only will not operate the clipper and so that pulses from the auxiliary channel only will not operate the clipper but so that the simultaneous applications of the received echo pulse and of the auxiliary pulse do operate the clipper. Furthermore, since the filter 17 is designed to eliminate currents of the pulse frequency, it follows that the frequency meter will only respond to the lower frequencies at which said echo and auxiliary pulses coincide. Such coincidence will occur if an object is moved from the critical distance $$\frac{X}{2}$$

through the intervening distances toward NX or vice versa. The velocity of such movement is proportional to the frequency at which the pulses coincide.

Since the receiver is blocked or blanked at the instant of the transmission, the auxiliary channel provides the reference or auxiliary pulses which are delayed or displaced as shown in Figure 3. The echo pulses are represented as an infinite number in Figure 3, but it should be understood that the illustration is to indicate the variations in the times of reception and not the interval between pulses which is a constant, plus the increment due to the Doppler Effect, if the reflecting object is moving. In other words, a single echo pulse varying in phase is represented as a large number of pulses, instead of a single pulse moving along the time axis. In any event, the echo pulses from objects at critical distances will coincide with the auxiliary pulses and will add to form the clipper-operating pulse.

Since the frequency will not be very high for objects moving at velocity of the order of 100 miles per hour, a frequency multiplier 25 may be included in the auxiliary circuit as shown in Figure 1. For higher velocities, the frequency multiplier may be omitted. For measuring velocities of the order of 200 to 400 miles per hour, a pulse frequency of at least $1 \times 10^7$ per second and preferably higher frequencies should be used and even then the frequency of coincidence of the auxiliary and echo pulses will be low. It is, therefore, preferable to multiply the frequency of both the echo pulses and the auxiliary channel pulses. When the frequency of the received echo pulses is multiplied substantially, the frequency of the coincident pulses is raised to a useful value.

In Figure 2, the essential elements have been shown but, for simplicity, the phase shifter 23 and second pulse generator 27 of Figure 1 have been omitted. Furthermore, the detector 13 has been arranged to perform the functions of the clipper circuit 15. The frequency multiplier 33 in the receiver channel is essentially the same as the frequency multiplier 25 in the auxiliary channel. The operation of the circuit of Figure 2 corresponds to that of Figure 1 with the additional step of multiplying the frequency of the received echo pulses. It should be understood that the blanking and phase shifting means 29, 31 and the filtering means 17, illustrated in Figure 1, may be included in the circuit of Figure 2.

It is not necessary to describe in detail all of the elements of the circuits because such elements are known to those skilled in the art. By way of example, the pulse generator and transmitter may follow the teachings of Irving Wolff's application Serial No. 182,418 which has matured into Patent No. 2,403,624, dated July 9, 1946. The receiver and the blanking means may embody the inventions described in Rogers M. Smith's U. S. Patent No. 2,227,604, and application Serial No. 267,475, filed April 12, 1939, respectively. The Smith application also discloses phasing means; moreover, tunable circuits may be used as phase shifters. As is well known, thermionic tubes and their associated circuits may be adjusted to operate as frequency multipliers. The frequency meter may be of the type disclosed in Sander's U. S. Patent No. 2,228,367.

If the detector is used as a clipper, as shown in Figure 2, its input circuit is biased so that input currents having an amplitude of the received echo pulse, or the pulse from the auxiliary channel, have no effect thereon. If a separate clipper circuit is used, it may be of the type illustrated in Figure 4. In the illustrated circuit, the input is biased as previously described.

Thus, the invention has been described as an improved pulse-echo motion detector in which a series of pulses are radiated toward an object. After the pulses are reflected from the object, they are received at or near the source of radiation. If the object has a component of motion toward or away from the transmitter, the received echo pulses will coincide with the local pulses, when the object reaches predetermined points. The rate of such coincidence determines the velocity of the object with respect to a line through the object and the transmitter or source of radiation. The velocity may be indicated directly by calibrating the frequency indicator at the receiver in terms of velocity. The useful range of the device is increased by multiplying the frequency of both the echo and local auxiliary channel pulses. It should be understood that the output pulses of either of the local auxiliary channels or of either of the receiver channels may be shaped to form a sine wave or other wave form before combining.

I claim as my invention:

1. A pulse-echo system of indicating motion of a pulse-reflecting object including, in combination, means for radiating at a predetermined frequency pulses of energy, means for receiving said pulses after reflection from said object, means for establishing a current bearing an integral frequency relation to said predetermined frequency, means for multiplying the frequency of said established current, a combining circuit connected to said receiving means and including means responsive to received pulses and to recurrent portions of the output of said frequency multiplying means applied coincidentally, and means connected to said combining means for indicating the frequency of such coincidental application.

2. A pulse-echo system for indicating motion of a pulse-reflecting object including, in combination, means for radiating at a predetermined frequency pulses of energy toward said object, means for receiving said pulses after reflection from said object, means for multiplying the frequency of said received pulses, means for establishing a current of a frequency which is a multiple of said predetermined frequency, a combining circuit connected to said frequency multiplying means including means responsive to said frequency multiplied received pulses and to recurrent portions of said established current applied coincidentally, and means connected to said combining means for indicating the frequency of such coincidental application.

3. A pulse-echo system for indicating motion of a pulse-reflecting object including, in combination, means for radiating pulses of energy toward said object, means for receiving said pulses after reflection from said object, means for establishing a delayed set of pulses corresponding to said radiated pulses, a combining circuit connected to said receiving means, said combining circuit including means responsive to the combined amplitudes of coincident received pulses and established pulses and nonresponsive to noncoincident pulses, and means connected to said combining means for indicating the frequency of such coincidence.

4. A system according to claim 1 including means effectively connected to said receiving means for minimizing the response of said receiving means to signals other than selected pulse-echo signals.

5. A system according to claim 2 including means connected to said receiving means for blanking said receiving means with respect to undesired signals.

6. The method of indicating the motion of a pulse-reflecting object in the direction of a pulse transmitter and receiver which includes radiating pulse energy at a predetermined frequency, receiving said energy after reflection from said object, establishing a current of a frequency which is a multiple of said predetermined frequency, combining said received energy with recurrent portions of said established currents upon coincidence thereof, and indicating the frequency of such coincidence.

7. The method of indicating the motion of a pulse-reflecting object in the direction of a pulse transmitter and receiver which includes radiating pulse energy at a predetermined frequency, receiving said energy after reflection from said object, establishing a current of a frequency which is a multiple of said predetermined frequency, combining said received energy with recurrent portions of said established currents upon coincidence thereof, eliminating currents of the predetermined frequency and multiples thereof, and indicating the frequency of such coincidence.

8. The method of indicating the motion of a pulse-reflecting object in the direction of a pulse transmitter and receiver which includes radiating pulse energy at a predetermined frequency, receiving said energy after reflection from said object, multiplying the frequency of said received energy, establishing a current of a frequency which is a multiple of said predetermined frequency, combining said received frequency multiplied energy with recurrent portions of said established currents upon coincidence thereof, and indicating the frequency of such coincidence.

9. The method of indicating the motion of a pulse-reflecting object in the direction of a pulse transmitter and receiver which includes radiating pulse energy at a predetermined frequency, receiving said energy after reflection from said object, multiplying the frequency of said received energy, establishing a current of a frequency which is a multiple of said predetermined frequency, combining said received frequency multiplied energy with recurrent portions of said established currents upon coincidence thereof, eliminating currents of the predetermined frequency and mutiples thereof, and indicating the frequency of such coincidence.

THOMAS T. EATON.

REFERENCES CITED

The following references are of record in the file of this patent:

UNITED STATES PATENTS

| Number | Name | Date |
| --- | --- | --- |
| 1,750,668 | Green | Mar. 18, 1930 |
| 1,945,952 | Nicolson | Feb. 6, 193 |
| 2,403,625 | Wolff | July 9, 1940 |